Sept. 23, 1969  C. G. MATSON  3,468,504
DIVERGING BAR TYPE VIBRATOR MOUNT
Filed Oct. 30, 1967
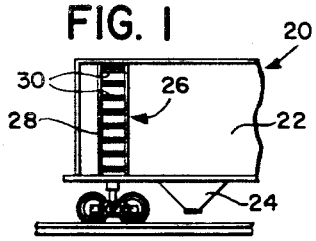
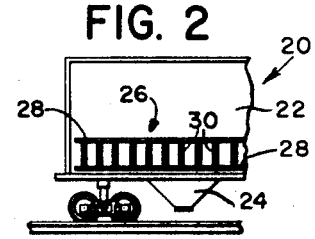
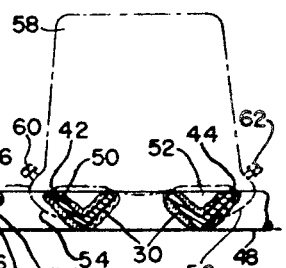
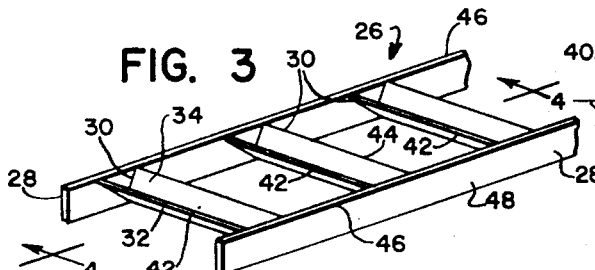
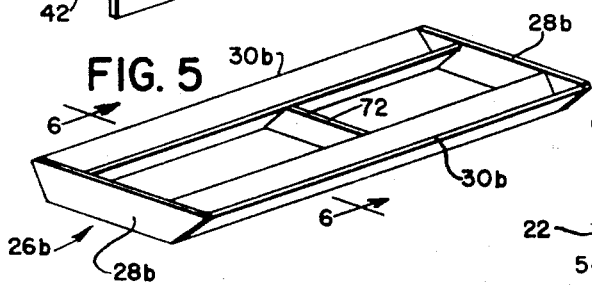
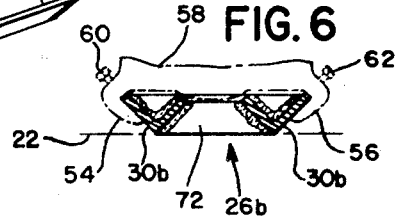
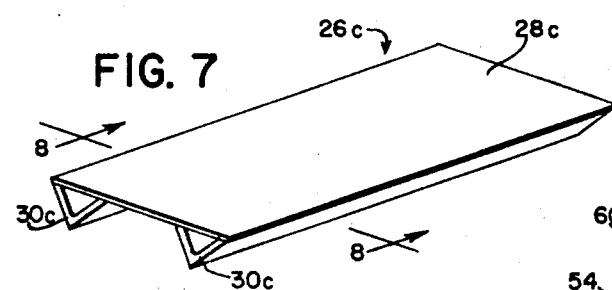
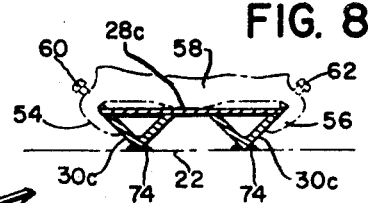
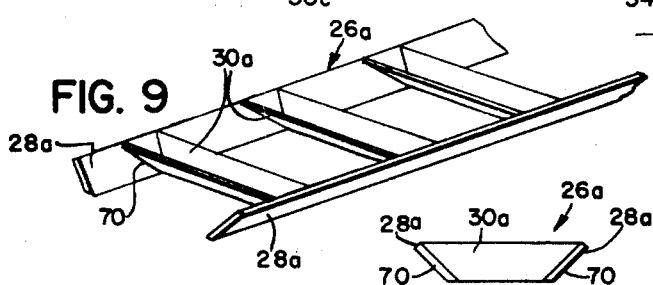
*INVENTOR.*
CARL G. MATSON

United States Patent Office 3,468,504
Patented Sept. 23, 1969

3,468,504
DIVERGING BAR TYPE VIBRATOR MOUNT
Carl G. Matson, 401 E. Central Ave.,
Kewanee, Ill. 61443
Filed Oct. 30, 1967, Ser. No. 678,845
Int. Cl. F16m *1/00*
U.S. Cl. 248—14      7 Claims

ABSTRACT OF THE DISCLOSURE

A mount for attaching a vibrator to the structure of an object to be vibrated, featuring at least a pair of bar-like members arranged in divergent relation so as to be receivable of the convergent opposed clamp jaws of a vibrator, the bars being maintained rigidly in spaced apart and divergent relationship by means spanning them and the whole being securable to and/or capable of being incorporated into the structure of the object to be vibrated.

BACKGROUND OF THE INVENTION

The use of vibrators in the field of materials-handling is well known, the primary advantages being derived from a more facile handling, settling, loading, unloading, compacting etc. of such fluent material as concrete, coal, grain and the like. In a typical arrangement, a vibrator, usually of the rotating eccentric weight type, is provided with specially constructed clamp means attachable by clamping action to complementary ribs, bars, etc. welded or otherwise rigidly affixed to the object to be vibrated, which may be a hopper car, chute, steel form, receptacle or object of like nature. In large-scale operations, it is necessary that the vibrator be attached, removed and re-installed at several locations on the object to ensure adequate treatment of the material, and this is especially true of railway hopper cars having several loading and unloading openings or areas. Consequently, it is desirable that the mounting means, as well as the clamp means on the vibrator, be not only of rugged construction but of such character as to enable considerable versatility and flexibility in the use thereof. The problems to be guarded against include the tearing off of the rails, webs etc. from the structure, despite apparent adequate welding; loosening of the vibrator clamp, which causes the vibrator to become dislodged and results in damage to the unit itself as well as to persons in the vicinity thereof; destruction of the mount by repeated clamping and unclamping of the vibrator, often leaving the mount with jagged protruding portions apt to snag and injure a person standing near a moving hopper car, for example; difficulties in securing adequate mounts and vibrator sizes for large receptacles constructed of light-weight materials, because of the tendency of the light-weight material to fail under the forces induced by the vibrator; and the undesirability of cluttering certain objects with complicated reenforcing structure that detract from the appearance of the object, as when in transit etc.

Many solutions to the above and other problems have been advanced, including ribs presenting opposite flat sides to which a vibrator may be clamped by a straddle-type mount, wedge pockets into which vibrator-carrying male wedges may be driven, welded-on bars and the like, and various other devices serving mainly the purpose of temporarily mounting a vibrator but having little aptitude for versatility, flexibility, inherent reenforcement of the structure and appearance.

SUMMARY OF THE INVENTION

The present invention solves the above problems and avoids the aforesaid difficulties by the provision of one or more pairs of divergently related bars complementary to the opposed convergent clamp jaws of a vibrator, and this basic feature is extended by the use of a plurality of such bar pairs into either a ladder type arrangement enabling the installation of either a plurality of vibrators or a multi-installation of the same vibrator or a plate type construction or said ladder construction in which the bars are conveniently formed of, for example, common angle members utilizing opposed outwardly facing legs for the divergent clamp-receiving portions and the related legs for added strength. Further, the improved type of mount may be incorporated into the structure of the object to be vibrated, especially the ladder type, which lends itself to such incorporation because it may serve further useful purposes, especially in the instances of larger objects, such as railway hopper cars and the like. In such arrangement, the bars may be disposed either horizontally like the rungs of a ladder, or vertically, in either case blending into the appearance aspects of the structure. More particularly, the built-in, as well as the attachment, aspects of this type of mounting are especially adapted to large structures formed of lightweight material, such as aluminum, now commonly employed in many railway cars, where heretofore large vibrators have been excluded because most aluminum cars have little or no provision for attachment of such vibrators. Still further, the embodiments of the present invention lend themselves especially well to welding to the object to be vibrated, thus improving versatility because of the compatability thereof to the materials of which such objects are constructed. Further features and objects will become apparent as preferred embodiments of the invention are disclosed herein.

DESCRIPTION OF THE DRAWINGS

FIG. 1 is a small-scale fragmentary view illustrating one form of the invention on a railway car, by way of example;

FIG. 2 is a similar view showing another adaptation of the invention;

FIG. 3 is an enlarged perspective of the above form of mounting;

FIG. 4 is a section on the line 4—4 of FIG. 3, illustrating in broken lines the mounting of a typical vibrator;

FIG. 5 is a perspective of another form of the invention;

FIG. 6 is a section on the line 6—6 of FIG. 5, showing in broken lines a portion of a mounted vibrator;

FIG. 7 is a perspective of a further form of the invention;

FIG. 8 is a section on the line 8—8 of FIG. 7, again illustrating a vibrator in part in broken lines;

FIG. 9 is a perspective of a still further form of the invention; and

FIG. 10 is an end view of the structure of FIG. 9.

DESCRIPTION OF THE PREFERRED EMBODIMENTS

FIG. 1 illustrates an example of a typical object to be vibrated, namely a railway hopper car 20 having as part of its structure upright wall means 22 and an underside discharge hopper 24, of which there may be several. A ladder type vibrator mount is designated in its entirety by the numeral 26, in this case the mount being arranged with its predominant length vertically. In FIG. 2, the same car is shown with the same mount disposed with its length horizontally. These are of course only representative of how the mount could be arranged, both geographically and size-wise, the main purpose of the illustrations being to demonstrate two examples of the versatility of the mount.

Before describing the mount in detail, it is well to observe a few salient aspects of the construction of the mount. As will be brought out below, the pressure-force concentration is an important consideration and the requirement for tensile strength is reduced, which means that railway car manufacturers, whose trend is more and more toward aluminum cars, may now incorporate aluminum brackets or mounts of the above construction without materially increasing weight and at the same time not only increasing strength but providing an exceptional vibrator mount. This means that there is no longer any necessity for bolting special, crude brackets to the cars. A further benefit is that much larger types of vibrators may be used than were heretofore permitted, and, when the mount is constructed also of aluminum, which it may be because of its increased strength, it may be compatibly welded to the aluminum car structure. Also, in the bar type construction, the bars may be selectively spaced apart and thus can accommodate vibrators having differently spaced clamping jaws. The ladder type mount serves of course as a stiffening member for the car wall, whether it be incorporated as an original part of the car or affixed subsequently.

Briefly, and not by way of limitation, the mount structure 26 comprises a pair of parallel plate means or rails 28 between which are rigidly secured a plurality of angle members 30, each preferably a metal angle of conveniently available configuration and section and having a pair of legs 32 and 34 angularly related at 90° at a junction or corner 36 so that each member has of course a V shape. These members, as well as the plate means or rail 28, are of metal, steel where desired or aluminum etc. where welding compatibility is a desideratum. The rigid affixation of the angle members to the rails is here shown as being achieved by welding at 38. The showing of welding has been omitted from FIG. 3 in the interests of clarity. Likewise, the mount as a unit may be welded to the car—or equivalent object—wall 22 as by welding, shown at 40 in FIG. 4, the welding being omitted from FIGS. 1 and 2 because of the small scale of these figures.

Considering the angle members as in simple form; i.e., not as angles but as strips or bars, it will be seen that the leg 32 of one member has first and second opposite edge portions, one occurring at 42 and the other at the corner 36; and the cooperative leg 34 of the next adjacent or neighboring angle also provides similar edge portions, one at 44 and the other at the angle corner 36. The edge 42 of one angle member and 44 of the neighboring member are not only parallel to each other and spaced apart but lie in a common plane, here represented as including the top edges 46 (as seen in FIG. 4) of the rails 28. Since the angle members 30 are of identical construction, preferably, the corners 36 thereof lie of course in a second plane parallel to the plane of the rail edges 46, represented here by the opposite rail edges 48. Thus the leg 32 of one angle member 30 and the outwardly opposed leg 34 of the neighboring member 30 provide paired bars that lie in convergent-divergent relation to each other, convergent toward the plane of the rail edges 48 and divergent as to each other away from the plane of said rail edges 48. The basic arrangement is such that oppositely outwardly facing side portions 50 and 52 of neighboring angle members 30 provide divergent, complementary portions for receiving the opposed convergent clamp jaws 54 and 56 of a typical vibrator 58, an example of which unit is shown in the U.S. Patent to Peterson 3,036,658, except that in the present case the clamp jaws 54 and 56 are augmented by clamp screws 60 and 62, respectively, which engage the bar edge portions 42 and 44 respectively.

Although, in one arrangement of the vibrator 58 as to mounting, the angle member edges more closely adjacent to each other are not used, the unused legs still serve the function of adding strength, besides which the design enables the use of common, readily available angle members, thus adding to the overall strength, rigidity, simplicity and light-weight nature of the mount 26 as a whole. Obviously, angularly related portions of other members of U, L etc. shape may be employed to achieve these results. In a construction of the ladder type, the clampable bar edges are paired so that the vibrator may be mounted in a plurality of positions, not only lengthwise of the ladder structure as a whole but lengthwise of the angle members per se.

The clamping screws 60 and 62 operate at 45° angles, which complements the angle of 45° of each used angle member leg to the plane of the rail edges 46. Of course, since each angle member has legs at 90° to each other, both legs will lie at 45° to the aforesaid plane, and when alternate legs are used, these will be complementarily divergent so as to adapt themselves to the vibrator clamp jaws 54 and 56.

Another advantage of the FIG. 1 arrangement is that the mount 26 may be readily attached to or incorporated into the car wall means structure 22 and may even serve as a ladder. As to FIG. 2, as well as to FIG. 1, the mount may be arranged so as to actually enhance the appearance of the structure as well as to add strength thereto, besides its function as a multi-position vibrator mount. The spacing between the angle members 30 may be selected so as to accommodate vibrators having differently spaced clamp jaws. For example, a common size vibrator has a twelve-inch spacing and another type has a twenty-one inch spacing. Obviously, different sets or pairs of bars may be spaced according to the above, or according to any other desired spacing; that is to say, the angle members 30 may be either uniformly spaced or differently spaced in the same mount.

Also, in prolonged usage, it is expected that the clamping portions 50 and 52 will become somewhat marred by the action of the clamping screws 60 and 62, but the unused-as-clamps rail edges 46 will still present smooth surfaces mainly outwardly beyond these possible marred edges and will preclude snagging of persons standing or working in the vicinity of a passing car, for example, from which the vibrators have been removed. As a further feature, the opposed divergent or beveled portions 50 and 52 enable retention of a vibrator even though the clamp screws 60 and 62 may have become loose or may have failed of initial tightening; that is to say, the vibrator will not fall off and cause injury to itself or to an adjacent workman.

In the construction of the mount 26, the rails 28 are plate-like members perpendicular to the planes of the rail edges 46 and 48 and thus cannot themselves serve as divergent vibrator mounts where the vibrator is equipped with convergent cooperative clamp jaws like those at 56 and 56; although, they, or either of them, may be used for a straddle type mount of the type shown in the above Peterson patent. However, to further augment the versatility of the mount, the angle members may be constructed with divergent ends 70 as in the case of the mount 26a of FIGS. 9 and 10 wherein divergent-ended angle members 30a are secured between consequently divergent rails 28a, the angles of divergence of which rails is preferably 45° each to the plane from which the opposite legs of the angle members 30a diverge, thus adapting the mount to carrying of the vibrator 58 on the rails 28a as well as on the mated legs of the angle members 30a, as will be clear from the description of FIGS. 1–4. Again, welding may be employed as the means for achieving rigidity, but since this has been discussed above it is deemed to require no repetition. Suffice it to say that the construction of FIGS. 9 and 10 has all the attributes of FIGS. 1–4, besides the ability of the former to mount the vibrator on the rails 28a.

The form of the invention shown in FIGS. 5 and 6 lends itself to both an elongated construction, in which a vibrator such as that shown at 58 above may be mounted along opposite divergent legs of a pair of parallel angle members 30b, or a shorter construction of a size generally commensurate with the scale of the illustration, but in either case, the mount 26b adapts itself to welding or other affixation to an object to be vibrated, such as the wall means 22 of the car 20 or its equivalent, and again the mount may be an attachment to or an incorporation in the object structure. The plate means that secures the angle members 30b in fixed spaced apart relation may include opposite end plates 28b and an intermediate brace plate 72. It will be clear from what has gone before that the vibrator 58 may be mounted in the above manner, again utilizing the divergent edge or side portions of the angle members 30b and the clamp jaws 54 and 56 and screws 60 and 62 of the vibrator.

The mount 26c of FIGS. 7 and 8 possesses many if not all of the characteristics already described, in this case including plate means 28c to which the free edges of a pair of parallel angle members 30c are affixed, as by welding, which needs no further description because of the importation of the welding means previously described. The width of the plate means 28c is commensurate with the spacing of the farthermost edges of the divergent legs of the paired angle members 30c and accordingly these divergent legs may accommodate the mounting of the vibrator 58 via its jaws 54 and 56 and clamp screws 60 and 62. This construction may be of any length and may of course be welded to the car wall means 22 as at 74, which may be taken as typical of the mount-to-car-wall welding means in the other embodiments.

I claim:

1. A diverging bar type mount for receiving the opposed convergent clamp jaws of a vibrator for mounting the vibrator on an object to be vibrated, comprising a pair of parallel elongated rails, each having inner and outer edges parallel to each other and arranged so that said inner edges are coplanar in an inner plane and said outer edges are coplanar in an outer plane parallel to the inner plane, and a plurality of cross members normal to and rigidly cross-connecting the rails, said cross members being uniformly spaced apart lengthwise of the rails, each cross member being a metal structural angle having first and second integrally related flanges meeting at a 90° corner, said members being of substantially identical construction and each being arranged with its corner at said inner plane and its flanges diverging toward said outer plane at respective angles of 45° to said inner plane so that the first flanges of selected ones of the members are combinable with the second flanges of selected others of the members to provide a plurality of pairs of diverging flanges for selectively receiving the convergent jaws of the vibrator.

2. The invention defined in claim 1, in which said rails diverge from said inner plane at 45° to said inner plane and are spaced apart on the order of the cross members to provide for additional selective mounting of the vibrator on the rails.

3. The invention defined in claim 2, in which each rail is a structural metal angle similar to the cross members and arranged with its corner at said inner plane.

4. The invention defined in claim 2, in which said rails and cross members are incorporated in the structure of the object to be vibrated.

5. The invention defined in claim 4, in which said rails and cross members are incorporated in said structure so that the rails are horizontal.

6. The invention defined in claim 4, in which said rails and cross members are incorporated in said structure so that the rails are vertical.

7. A diverging bar type mount for receiving the opposed convergent clamp jaws of a vibrator for mounting the vibrator on an object to be vibrated, comprising a pair of substantially identical metal structural angle members arranged in parallelism, each having first and second integrally related flanges meeting at a 90° corner and said members being arranged with their corners coplanar at an inner plane and their flanges respectively diverging from said plane to a parallel outer plane, the flanges of each member diverging at respective 45° angles to said inner plane so that the first flange of one member and the second flange of the other member provide a pair of divergent surfaces for receiving the convergent jaws of the vibrator, and means rigidly secured to and for joining the members together and for spacing same apart in parallelism as aforesaid and in which said means is a plate lying in said outer plane and rigidly secured to the free edges of all said flanges, said plate having a width substantially coextensive with the distance between the free edge of the first flange on one member and the free edge of the second flange of the other member.

References Cited

UNITED STATES PATENTS

| | | | |
|---|---|---|---|
| 1,418,655 | 6/1922 | Klemmer | 248—23 |
| 1,671,338 | 5/1928 | Banks et al. | |
| 1,970,740 | 8/1934 | Day. | |
| 2,296,184 | 9/1942 | Riise | 248—19 |
| 2,470,554 | 5/1949 | Hammond | 248—19 |
| 3,021,100 | 2/1962 | Verhota | 248—23 |
| 3,273,518 | 9/1966 | Shina | 108—55 |

ROY D. FRAZIER, Primary Examiner

J. F. FOSS, Assistant Examiner

U.S. Cl. X.R.

248—223